United States Patent

Ulics

[15] 3,678,707
[45] July 25, 1972

[54] BELLOWS FLEXIBLE JOINT

[72] Inventor: George Ulics, Plymouth, Mich.
[73] Assignee: Ford Motor Company, Dearborn, Mich.
[22] Filed: Sept. 22, 1970
[21] Appl. No.: 74,430

[52] U.S. Cl. .............................................. 64/11 B, 64/32 F
[51] Int. Cl. ........................................................ F16d 3/06
[58] Field of Search ........................... 64/32 F, 3, 11; 287/85

[56] References Cited

UNITED STATES PATENTS 3,055,195  9/1962  Olsoh ........................................ 64/11

FOREIGN PATENTS OR APPLICATIONS 1,015,258  9/1952  France ..................................... 64/11 B Primary Examiner—Edward G. Favors
Attorney—John R. Faulkner and Roger E. Erickson

[57] ABSTRACT

A flexible joint for transferring torque including a generally cylindrical metal bellows member interconnecting a pair of rotatable end members. The cross sectional shapes of the convolutions comprise circular arcs; each convolution adjoins the adjacent convolution at a point of inflection.

7 Claims, 2 Drawing Figures

Patented July 25, 1972 3,678,707

INVENTOR
GEORGE ULICS
BY John R. Faulkner
Roger L. Erickson
ATTORNEYS

BELLOWS FLEXIBLE JOINT

BACKGROUND AND SUMMARY OF THE INVENTION

A universal joint commonly used to transmit motion between two angularly misaligned rotating shafts is the simple Cardan joint. There are, however, many applications in which the Cardan joint is not well suited. One such application is where the nonuniform motion transmission characteristics of a Cardan joint provide unacceptable velocity variations between the input and output shafts. Another such application is where the weight or size of the joint is of primary importance. Many essentially constant velocity joints presently are available but are often too cumbersome or too expensive for many applications where substantially constant velocity is desired.

It has been found that a cylindrical bellows positioned between two end members provides a substantially constant velocity flexible coupling for rotating shafts at relatively low torque loads and low speeds. See, for example, U.S. Pat. No. 3,232,076 to Sundt dated Feb. 1, 1966. Recently, substantial developments have been made in adapting a bellows flexible joint to carry significantly higher torque loads at high speeds and at essentially constant velocity. See, for example, U.S. Pats. No. 3,621,674 to Ulics and Wheatley dated Nov. 23, 1971 and No. 3,623,339 to Muller dated Nov. 30, 1971.

This invention comprises an improvement to the aforementioned devices that significantly increases the torque bearing capacity of a bellows having a given mean diameter and stiffness. The invention also provides a reduction in stress concentrations within the individual bellows convolutions. Furthermore, the invention provides increased torsional rigidity over prior art bellows of the type shown in U.S. Pat. No. 3,232,076.

A flexible torque transfer joint constructed in accordance with this invention includes a pair of rotatable end members interconnected by generally cylindrical bellows having a plurality of axially disposed annular convolutions. The cross sectional shapes of the convolutions comprise circular arcs; each convolution adjoins the adjacent convolution at a point of inflection.

DETAILED DESCRIPTION OF THE PREFERRED EMBODIMENT

Figure 1:
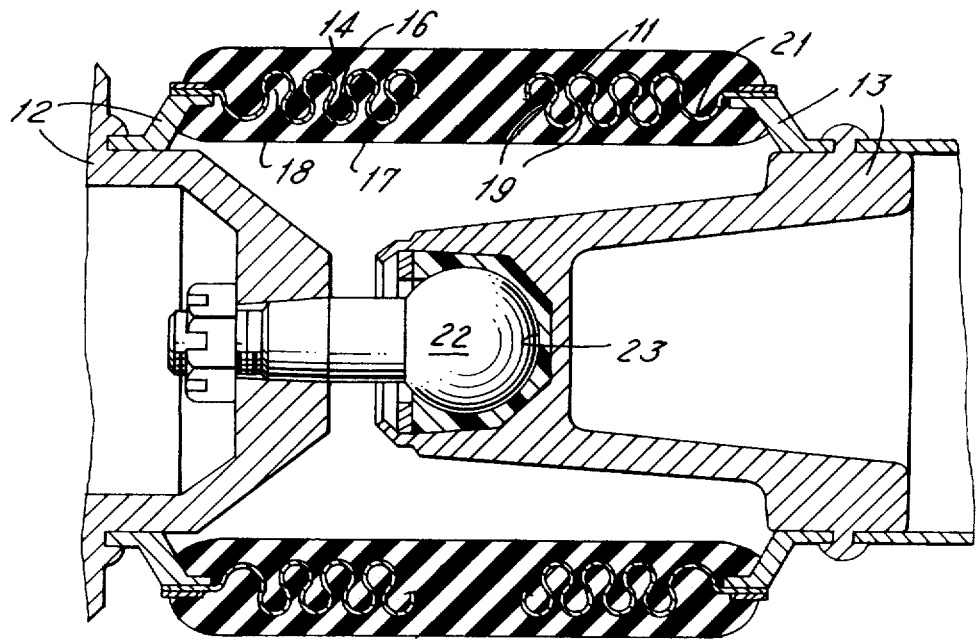
FIG. 1 shows a cross sectional view of a bellows flexible joint assembly embodying the invention.
Figure 2:
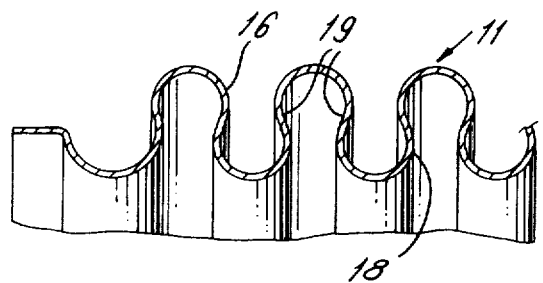
FIG. 2 shows an enlarged cross sectional view of a portion of a wall of a bellows flexible joint.

In the preferred embodiment of the invention, a metal cylindrical bellows 11 is fastened to and interconnects a pair of rotatable annular end members 12 and 13 as shown in FIG. 1 of the drawing. The bellows may be constructed of stainless steel of a thickness depending upon the torque load to be carried. Bellows 11 may be formed from single layer metal stock as shown in the drawings or of multi-layer stock which is generally capable of accommodating higher torque loads and greater operating angles. Elastomeric material 14 is received about the cylindrical bellows and is molded into each annular groove or convolution 16. Similarly, elastomeric material 17 is positioned within the radially inwardly opening grooves or convolutions 18 of the bellows. The bellows is sandwiched between and preferably bonded to the inner and outer layers of elastomeric material. The elastomeric material increases the torsional stiffness of the joint assembly while maintaining an acceptable level of bending stiffness.

In contrast with prior art devices, the cross sectional shapes of the convolutions comprise generally circular arcs. The convolutions in prior art devices are generally U-shaped having the circular portions interconnected by generally straight or plane portions. In the preferred embodiment of the instant invention the cross sections of the convolutions comprise circular arcs in excess of 180° joined at points of inflection. The axial extreme convolutions 21 have enlarged radii adjacent end members 12 and 13 to reduce stress concentrations.

A ball and socket centering device 22 and 23 may be optionally provided to fix the point of intersection of the rotatable end members 12 and 13. When such a centering device is provided the ball member 22 is rigidly fixed to one of the end members and the socket member is rigidly fixed to the other of the end members. The point of rotation is preferably at the axial midpoint of the cylindrical bellows.

Modifications and alterations will occur to those skilled in the art which are included within the scope of the following claims.

I claim:

1. A flexible torque transfer joint comprising
   a pair of rotatable end members,
   a generally cylindrical bellows inter-connecting said end members and being rotatable therewith,
   said bellows having a plurality of axially disposed annular convolutions,
   an axial cross section of said convolutions having a serpentine shape comprising continuously curved portions joined at points of inflection.

2. A flexible torque transfer joint according to claim 1 wherein
   said curved portions comprise circular arcs.

3. A flexible torque transfer joint according to claim 2 wherein
   said circular arcs have a length greater than a semi-circle.

4. A flexible torque transfer joint according to claim 1, elastomeric material received within and filling said bellows convolutions.

5. A flexible torque transfer joint according to claim 2, elastomeric material received within and filling said bellows convolutions.

6. A flexible torque transfer joint according to claim 3, elastomeric material received within and filling said bellows convolutions.

7. A flexible torque transfer joint comprising
   a pair of rotatable end members,
   a generally cylindrical bellows interconnecting said end members and constructed to transmit a torque therebetween,
   said bellows having a plurality of axially spaced annular convolutions,
   a cross section of said cylindrical bellows through its axis having a serpentine shape comprising continuously curved portions joined at points of inflection.

* * * * *